(12) United States Patent  (10) Patent No.: US 7,532,431 B2
Solhjell  (45) Date of Patent: May 12, 2009

(54) SINGLE ELEVATOR SYSTEM AND METHOD FOR A TAPE AUTOMATION SYSTEM WITH A BASE UNIT AND ONE OR MORE ADD-ON UNITS

(75) Inventor: Erik Solhjell, Oslo (NO)

(73) Assignee: Tandberg Storage ASA, Oslo (NO)

( * ) Notice: Subject to any disclaimer, the term of this patent is extended or adjusted under 35 U.S.C. 154(b) by 482 days.

(21) Appl. No.: 11/375,842

(22) Filed: Mar. 15, 2006

(65) Prior Publication Data

US 2007/0217062 A1  Sep. 20, 2007

(51) Int. Cl.
*G11B 15/68* (2006.01)
(52) U.S. Cl. ....................................................... 360/92
(58) Field of Classification Search ........................ None
See application file for complete search history.

(56) References Cited

U.S. PATENT DOCUMENTS

| 5,546,366 | A | * | 8/1996 | Dang ....................... 369/30.39 |
| 5,870,245 | A | * | 2/1999 | Kersey et al. ............... 360/92.1 |
| 6,735,042 | B2 | | 5/2004 | Hoelsaeter et al. |
| 6,816,335 | B2 | | 11/2004 | Hoelsaeter et al. |
| 6,829,116 | B1 | | 12/2004 | Owens et al. |
| 6,870,703 | B2 | | 3/2005 | Hoelsaeter et al. |
| 7,119,982 | B2 | * | 10/2006 | Starr et al. ................. 360/92.1 |
| 2005/0146808 | A1 | * | 7/2005 | Hoelsaeter .................... 360/92 |

* cited by examiner

*Primary Examiner*—Mark Blouin
(74) *Attorney, Agent, or Firm*—Schiff Hardin LLP (57) ABSTRACT

For adding on to a tape automation system, a base unit is provided having at least one tape cartridge magazine having a plurality of tape cartridge receiving locations, a tape drive, a tape cartridge pickup which transports the tape cartridge from a tape cartridge receiving location after extraction to a tape drive in a first direction, a tape cartridge pickup guide along which the tape cartridge pickup travels, and an elevator system which moves the cartridge pickup guide in a second direction perpendicular to the first direction. The base unit has a removable cover. An add-on unit is provided having at least one tape cartridge magazine having a plurality of tape cartridge receiving locations. The cover is removed from the base unit and the add-on unit is placed on the base unit. The base unit elevator system is used to retrieve tape cartridges with the cartridge pickup from the add-on unit cartridge magazine and also from the base unit cartridge magazine.

19 Claims, 7 Drawing Sheets

SINGLE ELEVATOR SYSTEM AND METHOD FOR A TAPE AUTOMATION SYSTEM WITH A BASE UNIT AND ONE OR MORE ADD-ON UNITS

BACKGROUND

Automatic systems for handling many tape cartridges (cassettes) in conjunction with one or more tape drives are becoming more and more important in the world of data storage, such as tape back-ups for computer systems. Such systems are typically called a "loader" if the systems contain one tape drive and a small number (5-16) of tape cartridges; and are typically called a "library" if the systems contain two or more drives (and normally from 10 cartridges and upwards). These systems are designed to meet the need for reliable, low cost data backup and retrieval in modern data storage systems. With the systems, one is able to select any one of all the cartridges in the automation system and automatically insert it into one or more of the tape drives, and then later replace the selected cartridge with the next cartridge needed for the system operation. With such systems, operator handling, which is costly, as well as operator mistakes, can be drastically reduced.

A common name for tape loaders and tape libraries is "tape automation systems", which is used hereafter. Also in the following, the word "cartridge" is used to cover both tape cassettes and tape cartridges.

Figure 1:
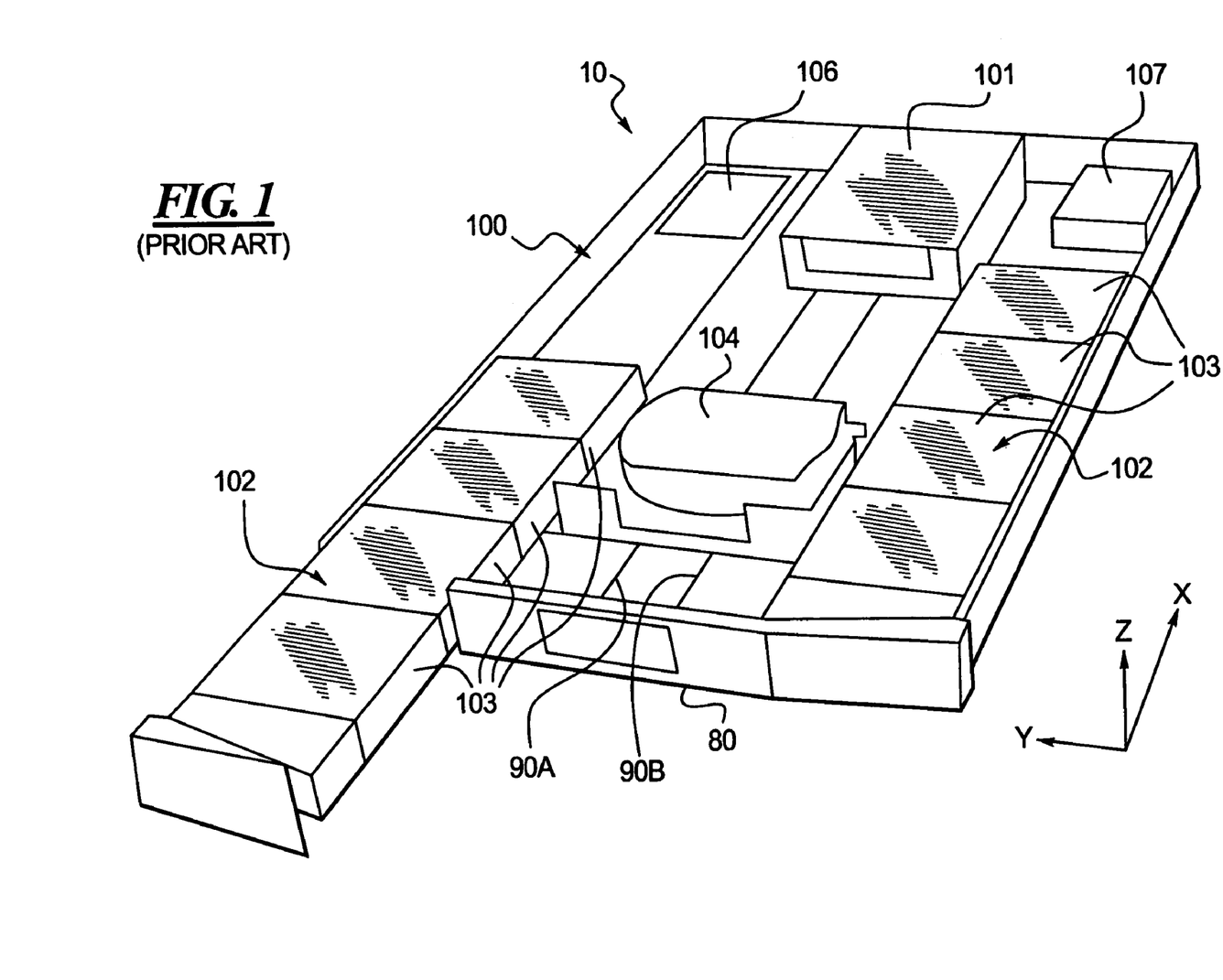
FIG. 1 is a perspective view of a prior art tape automation system.

Although the actual designs may vary significantly, a typical tape automation system 10 contains the following main items as shown in FIG. 1: a cabinet 100, one or more tape drives 101, one or more magazines 102 which each may contain a number of cartridges 103, a cartridge picker (robot) 104 which can take any cartridge from the magazines 102 and put into one of the tape drives 101 or vice versa. An example of this system is shown in U.S. Pat. No. 6,829,116, which shows in detail a prior art rotating cartridge picker. Larger systems may also have a system for lifting the cartridge picker to a different height to allow it to pick a cartridge from another magazine, or from another position within the same magazine.

Additionally, the tape automation systems contain some form of electrical control system 106 which controls the operation of the tape drive 101 and the cartridge picker 104, as well as communicating with a connected host computer. A power supply 107 supplies electric power for the entire unit.

The operation of a typical low end tape automation system having one tape drive 101 and just one or two magazines 102 is described hereafter, with reference to FIG. 1.

The specially designed magazine 102 containing the tape cartridges 103 is placed inside the tape automation system 10. the electrical control system 106 will (based on commands from the connected computer host), send signals to the cartridge picker 104 which moves along rail or rails 90A,B to pick a specific cartridge 103 from the magazine 102 and insert it into the tape drive 101. The tape drive 101 will then execute one or more active commands on the cartridge (reading/writing/winding etc.). When the tape drive 101 has finished its operations on the inserted cartridge 103, it will eject the cartridge from the tape drive 101. the cartridge 103 is then grabbed by the picker 104 and put back into the magazine. Then the cartridge picker 104 will take another cartridge 103 from the magazine, place it into the tape drive 101, and the operation continues. Note the cartridge picker operates in two main axis, X and Y. The X-direction is defined as the direction in and out of the tape drive, while Y is in the direction in and out of the magazines. In addition, the cartridge picker is able to rotate around its vertical axis (with a cartridge) so that the cartridge front either is positioned to be moved in or out of the tape drive (the X direction) or in or out of a room of the magazine (the Y axis).

Figures 2, 3, 4:
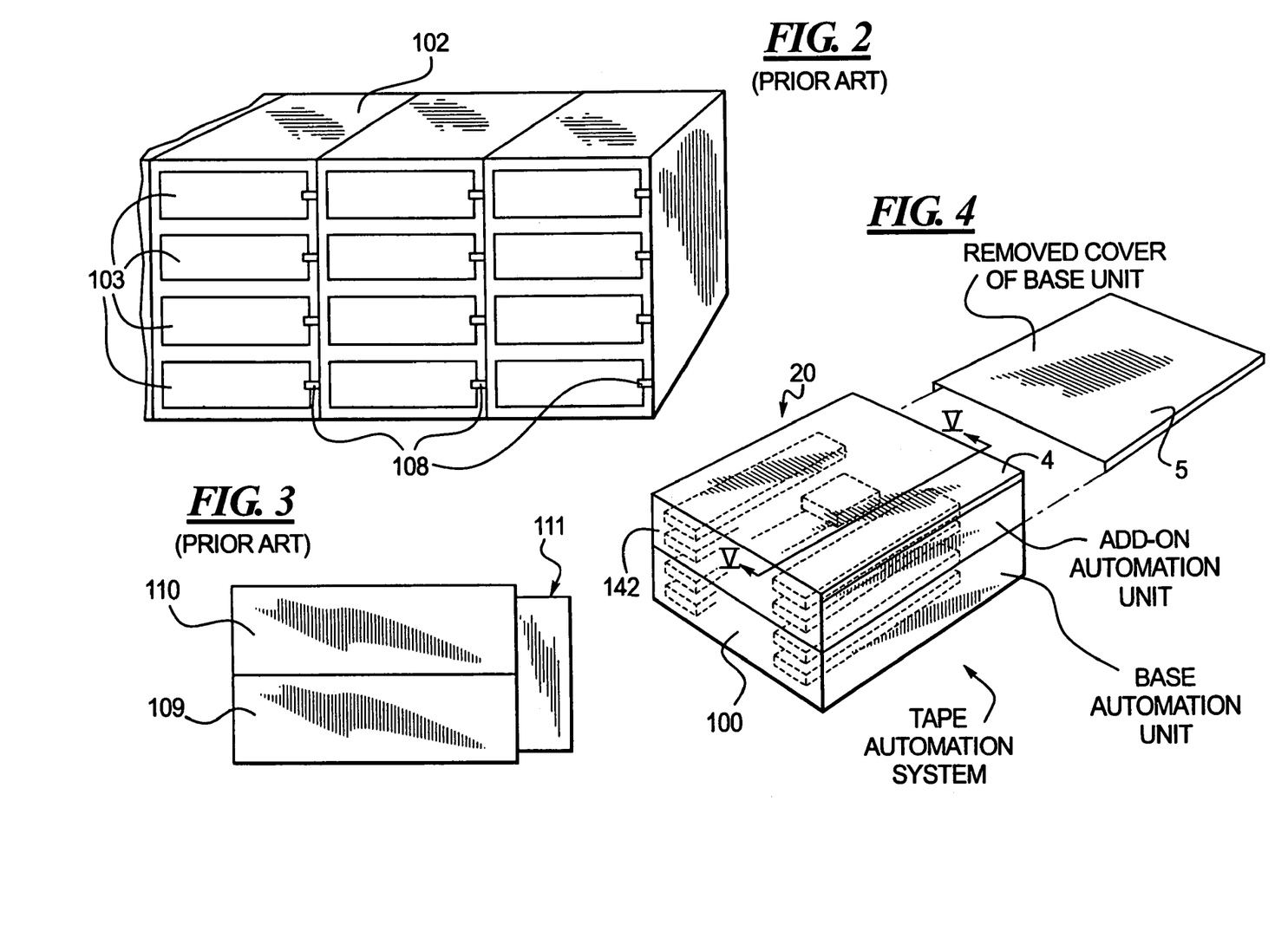
FIG. 2 is a perspective view of a prior art tape automation system having a plurality of stacked tape magazines.
FIG. 3 is a prior art tape automation system formed of two stacked automation units with a common elevator added at one end of the system.
FIG. 4 is a perspective view of a tape automation system of the preferred embodiment having a base unit and an add-on unit where the base unit has an elevator with picker which secures both units.

An automation system having several tape drives and magazines stacked on top of each other operates in the same manner, except that the picker 104 then has to move up and down between several levels of magazines and tape drives. FIG. 2 shows how cartridges 103 are stacked above each other with a stack of magazines 102. FIG. 15 of U.S. Pat. No. 6,829,116 also shows this. A small locking arm or finger 108 prevents the cartridge from falling out when the magazine is carried around. The magazine itself can be one single unit with storage rooms for all the specified cartridges, or the system can be designed to accept several magazines 102 (each typically with one or two levels of cartridges) stacked upon each other. Likewise the tape drives 101 (FIG. 1) can be stacked upon each other. In this case, the automation system will normally be equipped with a cartridge picker 104 (FIG. 1) that can move along all three main axes. In addition to the operation along the x and y axis described above in FIG. 1, the cartridge picker typically has a built-in elevator system to allow movement along the vertical Z axis of a cartridge inside the picker 102 to a specific tape drive level or cartridge room level.

Thus, in almost all low end automation systems, the cartridge picker is guided by a rail or a set of rails 90A,B as shown in FIG. 1. These rails 90 are normally mounted to the bottom plate 80 of the automation unit 10, and the cartridge picker 104 can run along the rails. To move to different heights within an automation system of the type shown in FIG. 2, the cartridge picker has a built-in elevator that can lift either almost the complete picker system or just the cartridge picker 104 itself up to the various heights within the automation system.

Compared to using a single drive, the tape automation system makes it possible to increase total storage capacity with anywhere from a typical factor of 7 up to upwards of many 1000's for the largest and most complex systems, with human handling and interference being reduced to a bare minimum.

Over the years, many forms and variations of automation systems have emerged; however, in the low end arena of the automation systems, more and more systems are now based on the same principle configuration as shown in FIG. 1.

From a physical size point of view, these systems are designed to fit into 19" wide racks, and come in fixed height sizes: 1 U (as shown on FIG. 1), 2 U, 3 U, 4 U (as shown in FIG. 2) and so on. Each "U" (="unit") means a height dimension of 1.75" or 41.5 mm. A 1 U system typically contains one tape drive and 4-8 cartridges in one or two magazines (see FIG. 1). The magazine stack shown in FIG. 2 will typically be part of a 4 U level system. Except for the 1 U systems, other systems (2 U and above) normally need to have a picker system designed so that the portion of the picker handling the cartridge can be moved up and down between the various levels, (normally done with a built-in elevator in the picker).

Low end systems are normally designed so that they are not expandable, meaning that they are designed for a fixed number of tape drives and cartridges. However, the actual number of drives and cartridges at the time of purchase may vary. For example, a typical 4 U system may contain two magazine groups, each with 4 levels and 4 cartridges on each level. It may also have space for up to four drives. However, the user may elect to buy the system with just one drive and for example only one group of magazines and cartridges (in this example then 16 cartridges). The user may then later install more magazines to bring the total number of available cartridge slots up to the maximum (in this case 32) and also install more tape drives (in this case up to a maximum of 4).

Should the user later need more capacity, he or she typically will have to buy a new automation system and connect this to the same computer. The two automation systems will operate independently of each other; however, both will (normally) be controlled by the same computer host.

As shown in FIG. 3, there exist prior art low end automation systems that are designed to be stacked upon each other and have a special lift or elevator 111 at an end of the system, so that cartridges from one automation unit can be passed up or down to the other unit. Here, two complete automations systems 109 and 110 are stacked upon each other. FIG. 3 shows the two units as seen from the side. At the back of the two units is mounted the "pass-thru" elevator 111. This is a special unit which can lift a cartridge from system 109 up to system 110 or vice versa.

This is done by the picker of system 109 first picking the cartridge to be moved out of its magazine slot and then placing the cartridge on a lift fixture inside the pass-thru elevator 111. The elevator then moves the entire lift fixture upwards until the cartridge can be reached by the picker of system 110. This picker then grabs the cartridge and either inserts it into one of the tape drives in system 110 or into a spare magazine slot of system 110.

The customer may add additional units on top of system 110 in order to increase capacity and performance of his or her system even further. In this case, an additional pass-thru elevator is also added on the back of the new unit to allow cartridges to be moved between all three system units.

While such a system as described above allows the user to increase capacity and performance outside the limits given by the fixed size unit, it is from a cost point-of-view not very effective. Each automation unit contains all the normal elements required for an automation unit (including a picker) and in addition there is the cost of the pass-thru elevator.

For very low end systems, it would be desirable to be able to have a low cost automation unit which can easily be expanded both with respect to number of cartridges and number of tape drives.

SUMMARY

For adding on to a tape automation system, a base unit is provided having at least one tape cartridge magazine having a plurality of tape cartridge receiving locations, a tape drive, a tape cartridge pickup which transports the tape cartridge from a tape cartridge receiving location after extraction to a tape drive in a first direction, a tape cartridge pickup guide along which the tape cartridge pickup travels, and an elevator system which moves the cartridge pickup guide in a second direction perpendicular to the first direction. The base unit has a removable cover. An add-on unit is provided having at least one tape cartridge magazine having a plurality of tape cartridge receiving locations. The cover is removed from the base unit and the add-on unit is placed on the base unit. The base unit elevator system is used to retrieve the tape cartridges with the cartridge pickup from the add-on unit cartridge magazine.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Figure 5:
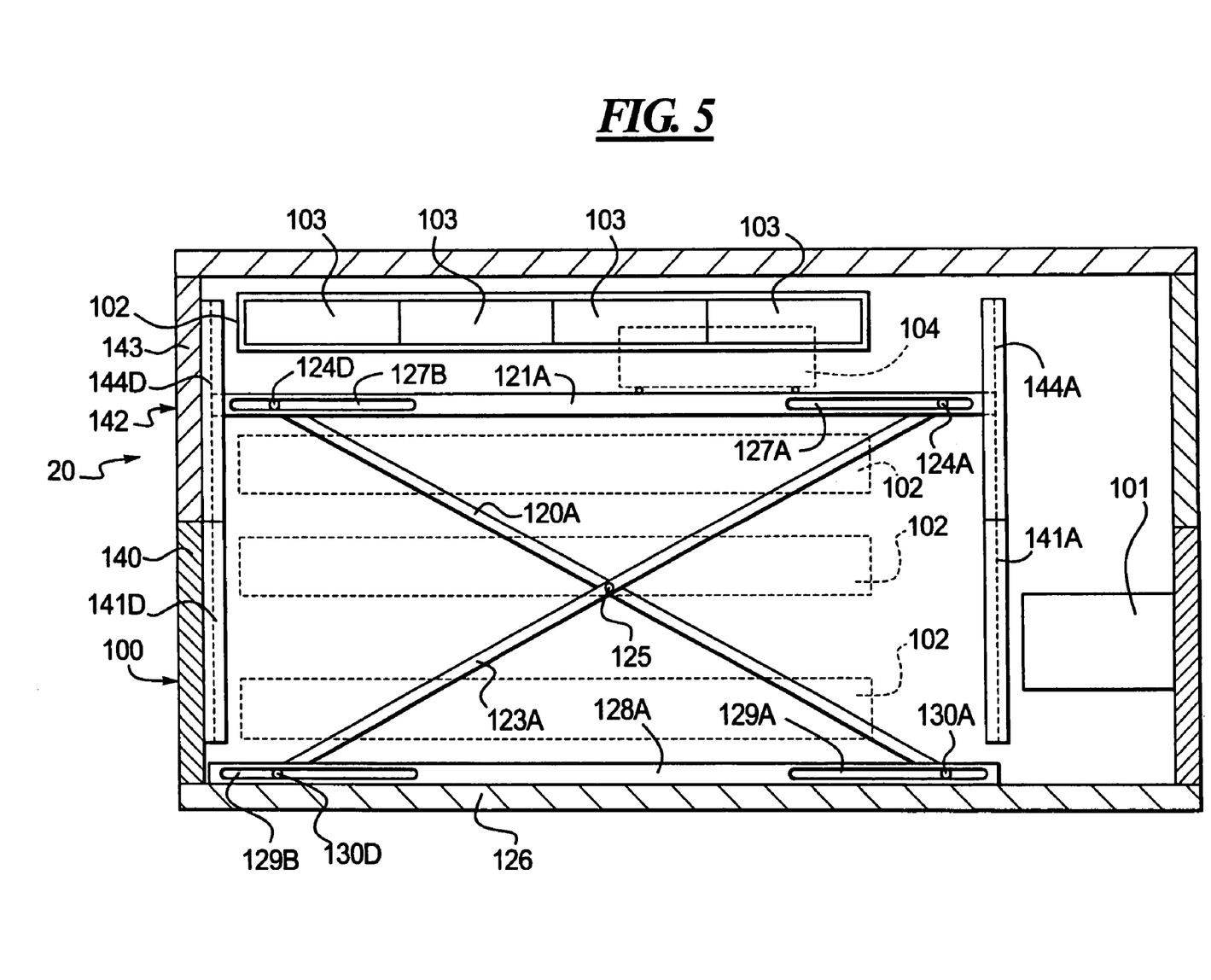
FIG. 5 is a cross-sectional view taken along lines V-V of FIG. 4.

As shown in FIGS. 4 and 5, with the preferred embodiment picker guide rails 121A,B for picker 104 are moved up and down within an automation system 20, and the system moving these rails is so flexible and effective that it allows the picker guide rails 121A,B to be moved vertically beyond the height of the base automation unit 100. By removing a top cover plate 5 of the base automation unit 100 and placing another add-on automation unit 142 having a removable cover 4 on top of the base unit 100 (without a bottom plate and without an additional cartridge picker), the guide rails 121A,B of the base automation unit 100 may be moved to such a height that the picker can operate within the add-on automation unit 142. It is also possible to provide one or more additional add-on automation units stacked upon the first add-on unit on base unit 100. The cover 4 would then be removed from the first add-on unit before adding the second add-on unit.

With the preferred embodiment, a user may begin with a very simple, low cost system, having a base unit 100 only typically 2 units (2 U) in height. Then, when there is a need for more capacity, the user may buy another add-on unit 142 also two units (2 U) in height (see FIG. 4) and mount this on the top of the first base unit 100. The top cover 5 on the base unit 100 must be removed before the add-on unit 142 is mounted on the top. FIG. 5 shows this in more detail where the top cover 5 of the base unit 100 has been removed and the new add-on unit 142 is mounted directly on top of the first base unit 100. Front wall 143 of the add-on unit 142 matches directly with the front wall 140 of the base unit 100. The same is true for the other three walls. Guide rails 144A,B,C,D of the add-on unit 142 will match directly with guide rails 141A,B,C,D of the base unit 100, so that the two vertical rails together at each location act like one long vertical guide rail.

Figures 8, 9:
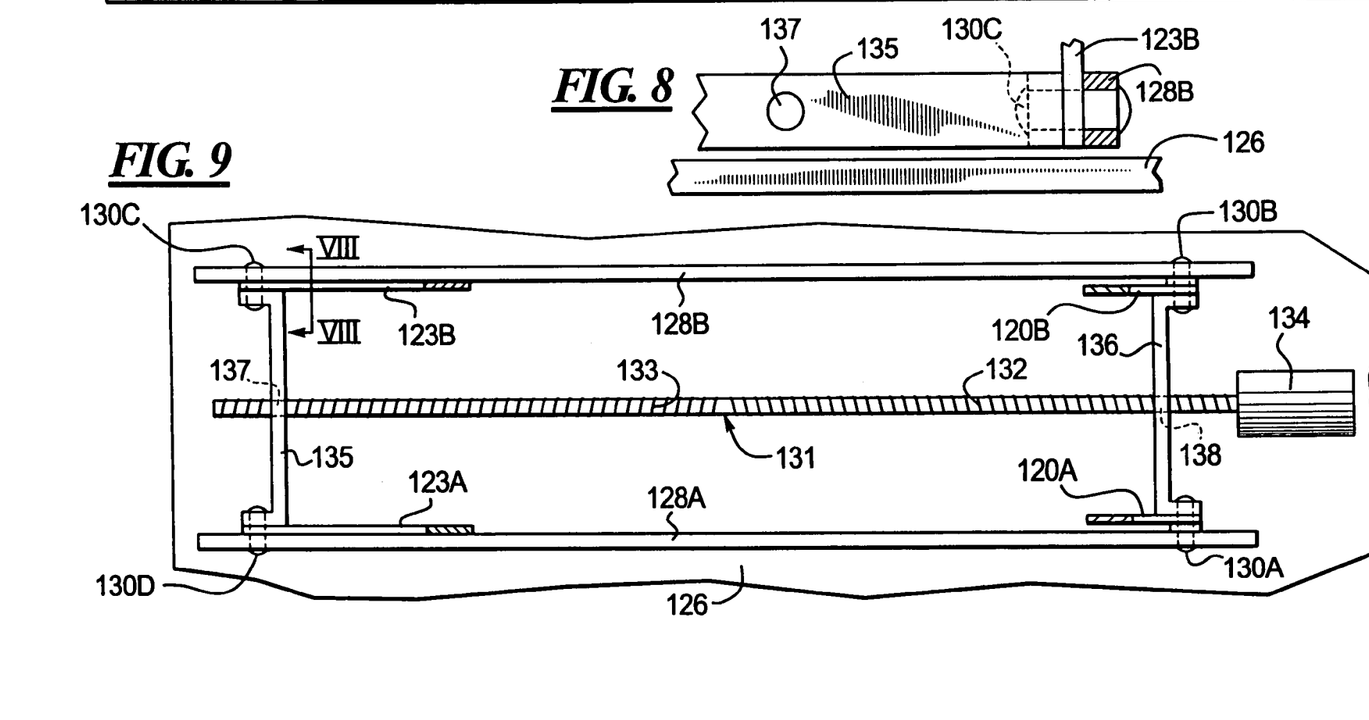
FIG. 8 is a detailed fragmentary view taken at section line VIII-VIII of FIG. 9 of a pivot pin attachment used in the elevator system of FIG. 7.
FIG. 9 is a top view of the elevator system of FIGS. 5, 6, and 7.

The elevator drawing in FIG. 5 is simplified in that a motor 134, a spindle 131, and beams 135 and 136 discussed hereafter in FIG. 9 are not shown to keep the drawing clear.

As shown in FIG. 5, the elevator system can lift guide rails 121A,B along which picker 104 moves up into the add-on unit 142 and, for example, can pick a cartridge from one of compartments 103 in the top-most magazine 102. The elevator system can then lower the guide rails 121A,B and the picker 104 down to a suitable level for inserting the selected cartridge into a tape drive 101.

This add-on unit 142 can be made at lower cost than the base unit 100, since it will not need an elevator system, a picker, or a tape drive. It will contain one or more magazines. It may contain a tape drive, however, if desired.

Depending upon a height of the base unit 100 and the add-on unit 142, it is also possible to even extend the system further with one or more additional add-on units. The limit is reached when arms 120A,B and 123A,B of the elevator system have moved so close together that the elevator system has reached its maximum practical height (due to requirements for stability of the guide rails 121A,B). This maximum will vary with the dimensions of the total base unit 100, the stability of the picker guide rails 121A,B, vertical guide rails 141A,B,C,D and 144A,B,C,D, and vertical guide and stability of the elevator system itself.

Thus this combined elevator system both represents a simple method to lift the picker 104 in automation system 20 to various height levels as well as also making it possible to design very low cost add-on units to the base unit. Without requiring elevators or a picker (or possibly even a tape derive), the cost savings for the add-on units can be significant.

Figure 6:
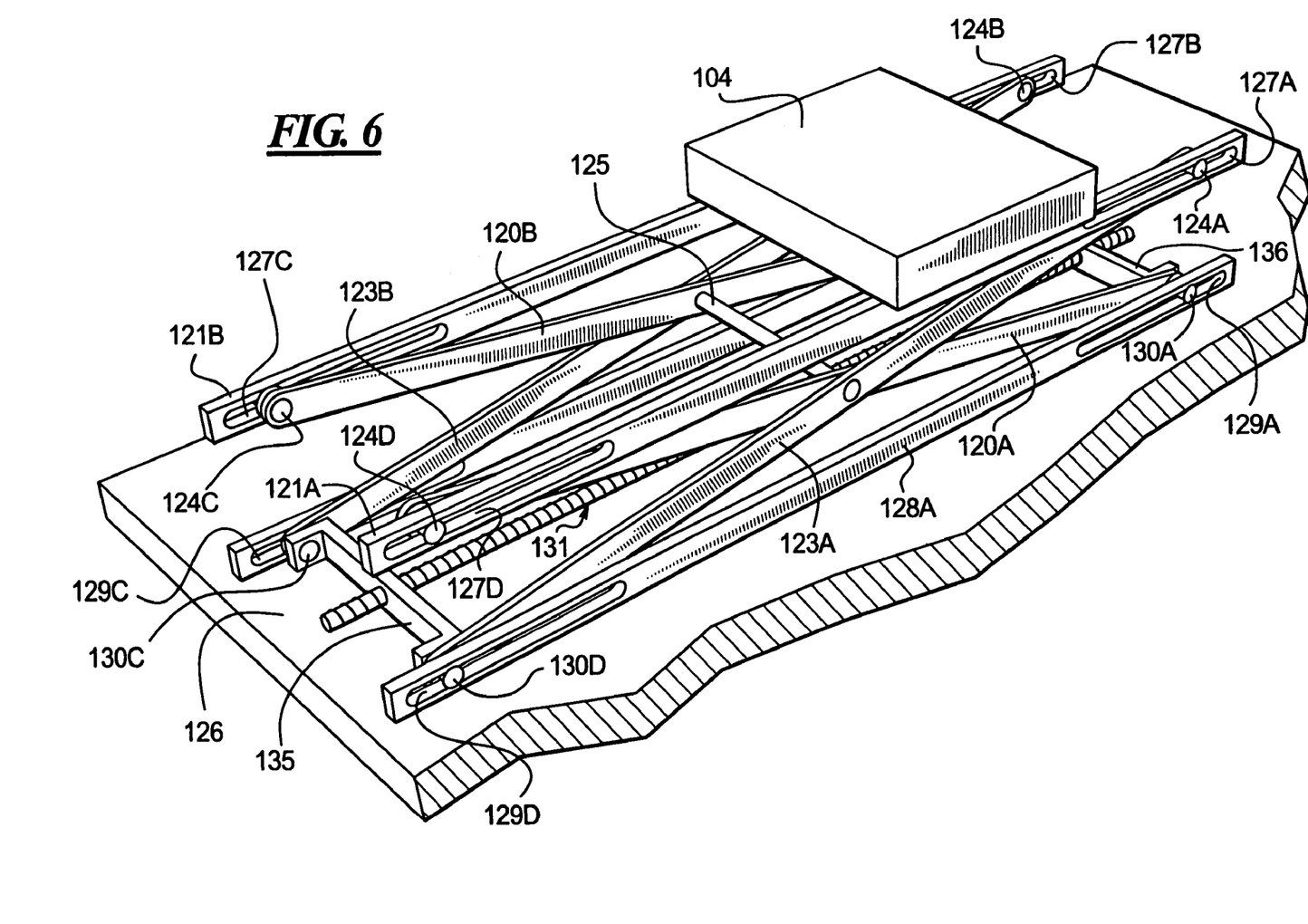
FIG. 6 is a partial view of an elevator system used in FIG. 5.

FIG. 6 shows a very simplified perspective drawing of the principle of the elevator system shown in FIG. 5. Here it is assumed that the cartridge picker 104 runs along the two guide rails 121A,B. These guide rails can be moved higher or lower from the bottom plate 126 with the use of the simple elevator system, comprising the arms 120A,B, 123A,B, as well as the axle 125. Axle 125 links at one end arms 120A and 123A with arms 120B and 123B at the other end. The axle 125 is mounted so it goes through a hole positioned approximately in the middle of each of the arms 120A,B and 123A,B. Moving the bottom ends of the arms 123A,B and 120A,B together on each side will lift the top ends of the same arms and therefore the guide rails 121A,B upwards. Moving the bottom ends of the arms 123A,B and 120A,B away from each other will lower the guide rails 121A,B. The guide rails 121A,B are linked to the arms 120A,B and 123A,B with pins 124A,B,C,D. The motor 134 of the elevator system for performing the movement of arms 120A,B and 123A,B by spindle 131 is not shown in FIG. 6 or 7, but is shown hereafter in FIG. 9. This elevator system can be made to lift the two guide rails 121A,B high, and more specifically higher, than the height of the basic automation unit 100.

Figure 7:
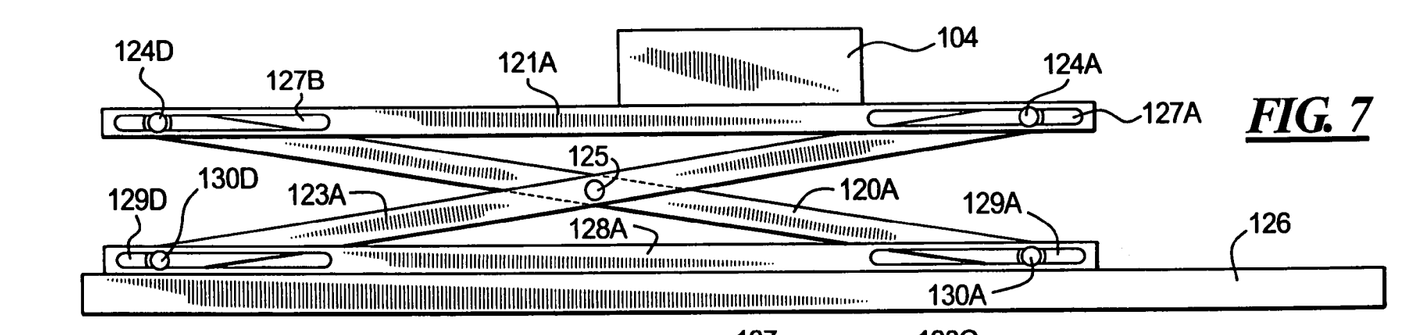
FIG. 7 is a side view of the elevator system used in FIG. 6.

FIG. 7 and FIG. 8, together with FIG. 6, show the elevator system in detail. FIG. 7 shows one side of the elevator system; the other side being identical. On the bottom plate 126 is mounted a pair of control rails 128A,B. Each of these rails have two elongated openings 129A,D or 129 B,C in which a respective bolt 130A,B,C,D can slide. Bolts 130A,B,C,D are mounted to the bottom ends of arms 120A,B and 123A,B. FIG. 8 shows along section VIII-VIII of FIG. 9 one of these bolts 130C and the associated structure in a fragmentary view.

As shown best in FIG. 6, an axle 125 passes through holes placed approximately in the middle of each arm 120A,B and 123A,B. Also as shown in FIG. 6, the upper guide rails 121A,B are mounted to the top end of each arm pair 120A,B and 123A,B with respective bolts 124A,B,C,D. The upper guide rails 121A,B also have elongated respective openings 127A,B,C,D (two in each rail) in which respective bolts 124A,B,C,D can slide.

FIG. 9 shows a bottom part of the elevator system seen from above. Only the bottom parts have been drawn in order to simplify the figure, and the upper picker rails 121A,B are not shown for clarity. FIG. 9 shows the bottom plate 126 with two control rails 128A,B. The bottom ends of arms 120A,B and 123A,B are connected to the control rails 128A,B with the bolts 130A,B,C,D. The bolts 130A,B,C,D (and thereby the bottom arm ends) can slide in the elongated openings 129A,B,C,D of the control rails 128A,B as shown on FIG. 7. The two bottom parts of arms 123A,B are linked together with a beam 135. This beam is connected to the ends of arms 123A,B using the bolts 130C,D so that the beam can rotate around the center of bolts 130C,D. A hole 137 is drilled through beam 135. This hole is equipped with internal screw threads. A spindle 131 with threads 133 corresponding to the internal threads in the hole 137, is threaded through the hole 137. This spindle 131 is connected to a motor 134 (preferably through a gear transmission system not shown here).

As also shown in FIG. 9, the lower ends of arms 120A,B are likewise linked together with another beam 136. This beam is connected to the arms 120A,B and the control rail 128A,B with bolts 130A,B, in the same way as already described above for arms 123A,B. A hole 138 with internal screw threads is also drilled through beam 136; however, the threads are made in the opposite direction of the threads in hole 137. The same spindle 131 goes through the hole 138 in beam 136, however the threads 132 on this portion of the spindle go in the opposite direction of threads 133. Therefore, spindle 131 has two sets of threads going in opposite directions and meeting at the spindle point which is approximately half way between beams 135 and 136.

The height of the picker guide rails 121A,B can now be controlled by rotating the spindle 131 by the motor 134. Rotating the spindle 131 counterclockwise (as seen from the motor 134) will move the two beams 135 and 136 towards each other. This will then move the upper ends of arms 120A,B towards upper ends of arms 123A,B and the guide rails 121A,B will move upwards from the base plate 126. The movement will be parallel to the base plate 126.

Likewise, rotating the spindle 131 clockwise (as seen from motor 134) will move the two beams 135 and 136 further apart. This again will lower the two guide rails 121A,B towards the base plate 126.

Figure 10:
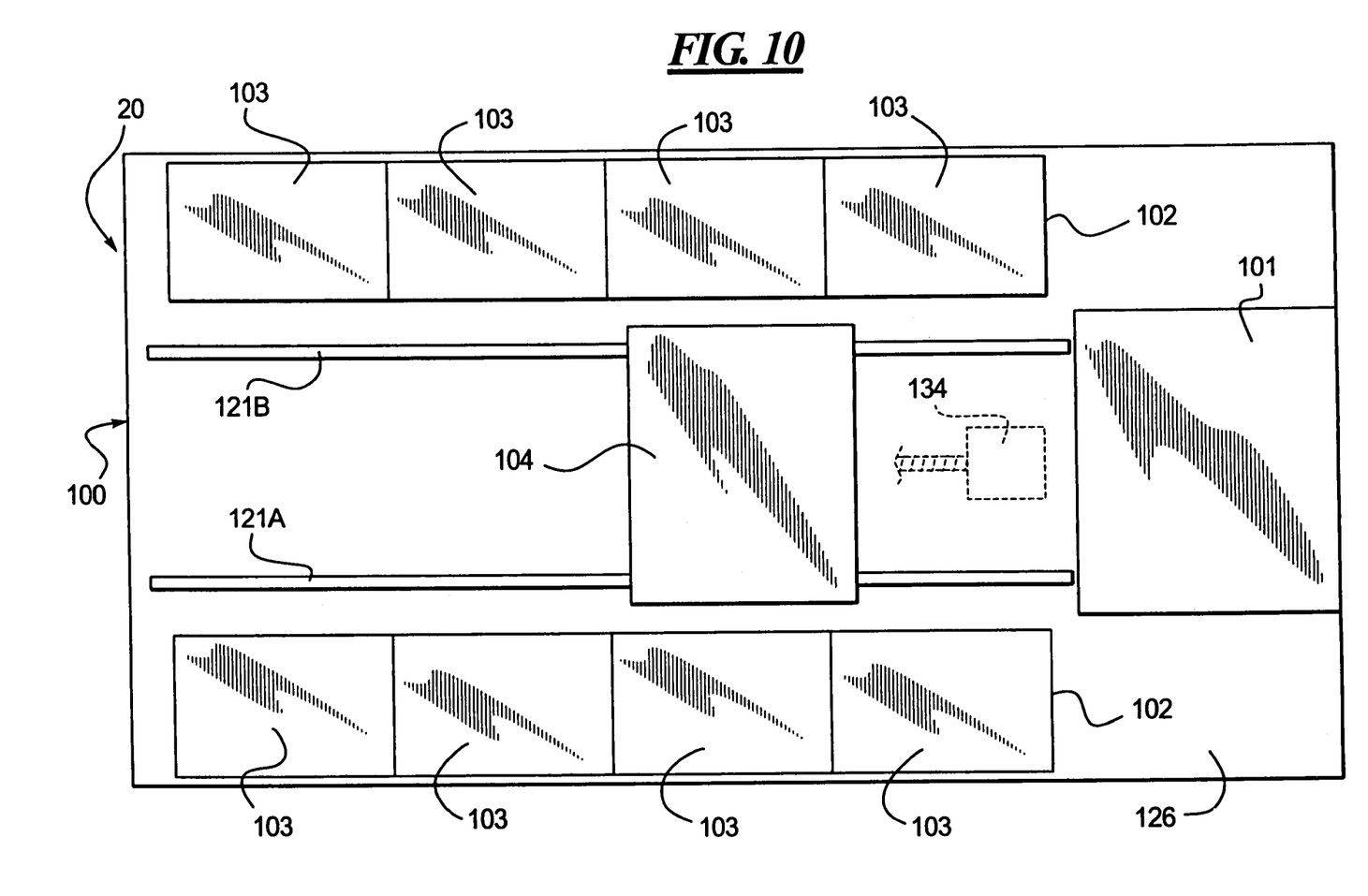
FIG. 10 is a plan view of the automation system of the preferred embodiment shown in FIGS. 4 and 5 but without vertical guide rails.

As mounted onto the base plate of the automation system 20 shown in FIGS. 4, 5 and 6, this elevator system can now be used to move the cartridge picker 104 to various height levels within the automation system 20. The picker 104 will be mounted on top of the guide rails 121A,B and run along the guide rails to allow cartridges to be moved from the magazine compartments to the tape drive and vice versa. This is shown in FIG. 10 (seen from above). The automation system 20 has the elevator system described in FIGS. 7, 8, and 9 mounted in the middle of the base unit 100. For simplicity, only the two guide rails 121A,B on the top of the elevator system are shown in FIG. 10. The picker 104 can move along the guide rails 121A,B. It can take a cartridge out from one of the cartridge compartments 103 in the magazines 102 and insert it into the tape drive 101 or vice versa. The magazine may have cartridge compartments in several different height levels as shown in FIG. 2. The elevator system described here can lift the guide rails 121A,B and thereby the picker 104 to the desired height level in order to reach a specific cartridge. Likewise, the same elevator system can lift the guide rails 121A,B and thereby the picker 104 up and down to allow easy insertion (or removal) of a cartridge into one or more tape drives 101 in the automation system 20.

Figure 11:
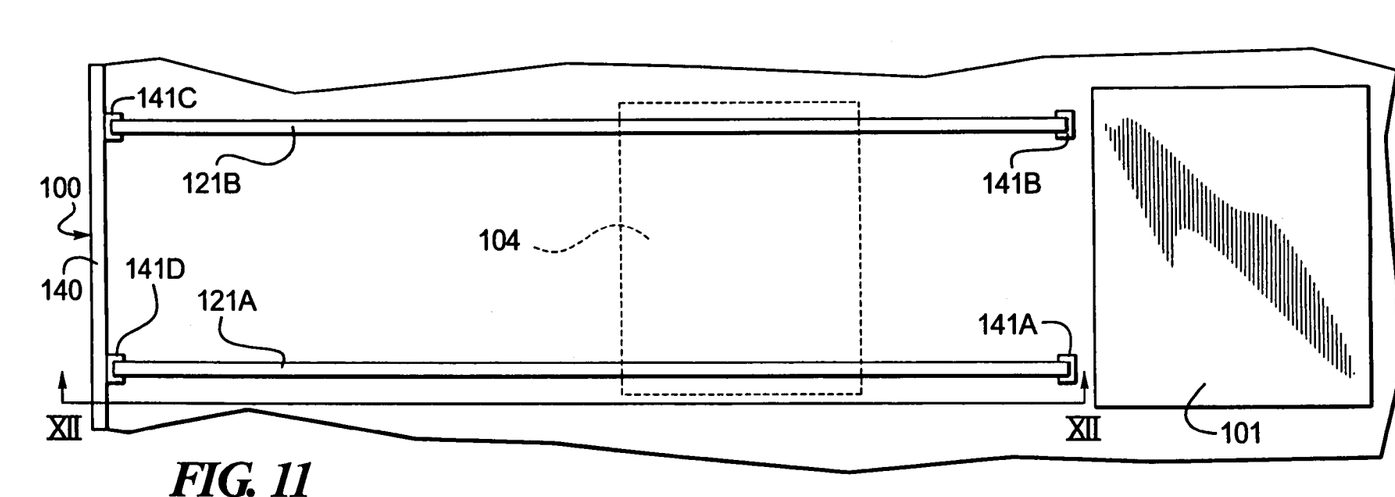
FIG. 11 is an alternative embodiment having vertical guide rails for the elevator system of FIGS. 4 and 5.
Figure 12:
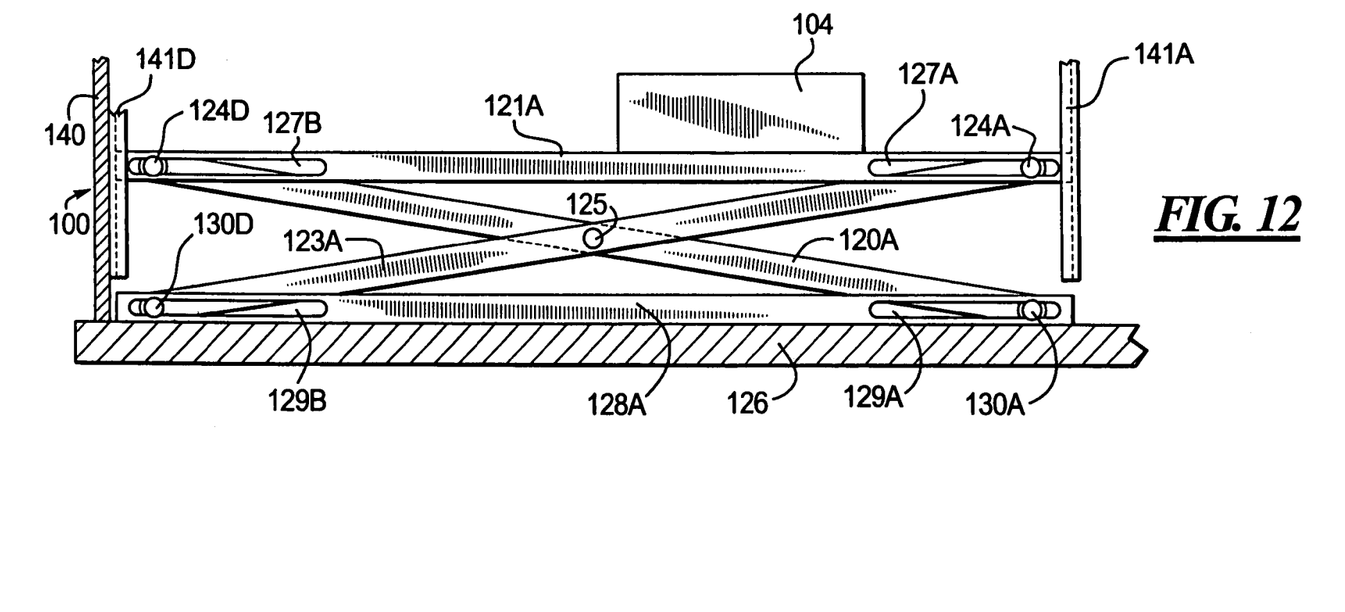
FIG. 12 is a fragmentary side view showing the use of the vertical guide rails of FIG. 11.

In FIGS. 9 and 10 the vertical guide rails of FIG. 5 are not provided. However, to increase the stability and accuracy of the positioning system, a set of special vertical guide rails 141C,D may be mounted vertically on the front wall 140 of base unit 100 as shown in FIGS. 5, 11, and 12 (and similar vertical guide rails 141A,B may also be mounted at the other end of the guiding rails 121A,B near the tape drive 101. Similar vertical guide rails 144A,B,C,D are provided on the add-on unit 142 (see FIG. 5) in matching positions so that they align with the base unit 100 vertical guide rails 141A,B,C,D. FIG. 11 shows the positioning of vertical guide rails 141A, B,C,D seen from above, while FIG. 12 shows the rail 141D of unit 100 only seen from the side.

While these vertical guide rails 141A,B,C,D may be designed in many different forms depending upon how the vertical guide rails are made, FIG. 11 shows a very simple U-form vertical guide rails 141A,B,C,D which will guide and control the end of the picker guide rails 121A,B as the elevator system moves the picker guide rails 121A,B upwards or downwards.

In principle, this elevator system described here may be used for many different forms of automation systems starting with low profile systems (like a 2 U or 3 U) and going up to at least 5 U or 6 U systems without experiencing any significant stability problems with the elevator guide rail system.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A tape automation system, comprising:
    a base automation tape unit having a first cabinet with sidewalls and at least one tape magazine therein having a plurality of tape receiving regions, a tape drive, a tape pickup which transports tapes from the tape receiving regions to the tape drive, a pickup guide along which said tape pickup travels, and an elevator which moves said tape pickup and pickup guide perpendicularly with respect to said path of travel;
    an add-on tape automation unit having a second cabinet with sidewalls at a top of the first cabinet and at least one tape magazine therein;
    said base unit cabinet having a top cover which is removed and said add-on unit having an opening in a floor of its cabinet for access of said tape pickup of said base unit;
    said base unit elevator being designed to operate said tape pickup when said base unit has its cover thereon and also having a sufficient perpendicular movement for said tape pickup when said add-on unit is in place for retrieval of tapes from said add-on unit magazine and delivery to said tape drive of said base unit; and
    said add-on unit not having a tape pickup.

2. A method for adding on to a tape automation system, comprising the steps of:
    providing a base tape automation unit having a first cabinet with sidewalls and at least one tape magazine therein, a tape drive, a tape pickup, a pickup guide for said tape pickup, and an elevator connected to said pickup guide for motion of said tone pickup and pickup guide in a direction perpendicular to a travel path of said tape pickup along said pickup guide, and said base unit first cabinet having a top cover;
    providing an add-on unit having a second cabinet with sidewalls and having a magazine, an aperture in a floor thereof, but no tape drive and no tape pickup;
    removing the cover from the base unit first cabinet and placing the add-on unit second cabinet on top of the base unit first cabinet where the cover was removed; and
    using said base unit tape pickup to retrieve a tape from a magazine in said add-on unit and delivering said magazine to said tape drive of said base unit.

3. A system of claim 1 wherein said add-on unit also has a tape drive and wherein said elevator system can deliver the tape cartridge extracted from said add-on unit cartridge magazine to said tape drive of said add-on unit.

4. A system of claim 1 wherein said pickup guide comprises a pair of guide rails.

5. A system of claim 1 wherein at least one vertical guide member running in a direction perpendicular to a longitudinal extent of said pickup guide is provided adjacent at least one end of said pickup guide.

6. A system of claim 5 wherein another of said vertical guide members is provided at an opposite end of said pickup guide.

7. A system of claim 1 wherein said pickup guide comprises a pair of rails, opposite ends of which are received in respective vertical guide rails.

8. A system of claim 1 wherein two cartridge magazines are provided in a stack in both said base unit and said add-on unit.

9. A tape automation system, comprising:
    a base automation tape unit having at least one tape magazine having a plurality of tape receiving regions, a tape drive, a tape pickup which transports tapes from the tape receiving regions to the tape drive, a pickup guide along which said tape pickup travels, and an elevator which moves that tape pickup perpendicularly with respect to said path of travel;
    an add-on tape automation unit having at least one of said tape magazines;
    said base unit having a top cover which is removed and said add-on unit having an opening in a floor thereof for access of said tape pickup of said base unit;
    said base unit elevator being designed to operate said tape pickup when said base unit has its cover thereon and also having a sufficient perpendicular movement for said tape pickup when said add-on unit is in place for retrieval of tapes from said add-on unit magazine and delivery to said tape drive of said base unit;
    sais add-on unit not having a tape drive; and
    said elevator system comprises a first set of first and second crossed arms connected by a pivot member and first ends of said crossed arms being guided along by respective elongated openings associated with said pickup guide and opposite second ends of said arms are guided by respective elongated openings of at least one control rail.

10. A system of claim 9 wherein said pickup guide comprises at least one guide rail in which said elongated openings are located.

11. A system of claim 9 wherein a second set of first and second crossed arms are provided having a pivot member and wherein an axel connects the pivot members of the first and second sets.

12. A system of claim 1 wherein said elevator system comprises a spindle having first and second threaded sections, the first and second threaded sections having opposite threadings, and said first threaded section being pivotably connected to an end of a first arm, said second threaded section being pivotably connected to an end of a second arm, opposite ends of the first and second arms being pivotably connected to elongated openings associated with said pickup guide, and wherein said first and second arms are connected pivotably to one another.

13. A system of claim 1 wherein said add-on unit has a removable cover to allow stacking of an additional add-on unit.

14. A tape automation system, comprising:
- a base unit having at least one tape cartridge magazine having a plurality of tape cartridge receiving locations, a tape drive, a tape cartridge pickup which transports a tape cartridge from the tape cartridge receiving locations after extraction to the tape drive in a first direction, a tape cartridge pickup guide along which said tape cartridge pickup travels, and an elevator system which moves said cartridge pickup guide in a second direction perpendicular to said first direction;
- an add-on unit having a removable cover placed on said base unit and having at least one tape cartridge magazine having a plurality of tape cartridge receiving locations;
- said base unit having a removable cover which is removed when said add-on unit is on said base unit, and said add-on unit having an opening for access of said cartridge pickup of said base unit as said cartridge pickup is moved in said second direction by said elevator system; and
- said base unit elevator system comprising crossed arms pivotably connected to each other and having a sufficient movement in said first and second directions when said add-on unit is on said base unit for extraction with said cartridge pickup of a tape cartridge from said add-on unit cartridge magazine.

15. A method for adding on to a tape automation system, comprising the steps of:
providing a base unit having a first cabinet with sidewalls and at least one tape cartridge magazine therein having a plurality of tape cartridge receiving locations, a tape drive, a tape cartridge pickup which transports a tape cartridge from a tape cartridge receiving location after extraction to the tape drive in a first direction, a pickup guide along which said tape cartridge pickup travels, and an elevator system which moves the tape cartridge pickup and pickup guide in a second direction perpendicular to said first direction, said base unit first cabinet having a removable cover;
providing an add-on unit having a second cabinet with sidewalls and having at least one tape cartridge magazine having a plurality of tape cartridge receiving locations;
removing said cover from said base unit first cabinet and placing said add-on unit second cabinet on said base unit first cabinet in a region at which said cover was removed; and
with said base unit elevator system, retrieving a tape cartridge with said tape cartridge pickup from said add-on unit cartridge magazine.

16. A method of claim 15 wherein after retrieving said tape cartridge from said add-on unit cartridge magazine, said tape cartridge pickup delivers said cartridge to said tape drive of said base unit.

17. A method of claim 15 wherein said add-on unit also has a tape unit and said tape cartridge pickup, after retrieving said tape cartridge from said add-on unit cartridge magazine, delivers said cartridge to said tape unit of said add-on unit.

18. A method for adding on to a tape automation system, comprising the steps of:
providing a base unit having at least one tape cartridge magazine having a plurality of tape cartridge receiving locations, a tape drive, a tape cartridge pickup which transports a tape cartridge from a tape cartridge receiving location after extraction to the tape drive in a first direction, a pickup guide along which said tape cartridge pickup travels, and an elevator system which moves the tape cartridge pickup guide in a second direction perpendicular to said fist direction, said first base unit having a removable cover;
providing an add-on unit having at least one tape cartridge magazine having a plurality of tape cartridge receiving locations:
removing said cover from said base-unit and placing said add-on unit on said base unit in a region at which said cover was removed;
with said base unit elevator system, retrieving a tape cartridge with said tape cartridge pickup from said add-on unit cartridge magazine; and
raising and lowering said cartridge pickup with said base unit elevator system by providing a pair of arms which are crossed at a pivot point and moving first ends of said arms closer to each other to raise the cartridge pickup, and moving said first ends further away from each other to lower the tape cartridge pickup.

19. A method of claim 18 including the step of moving said first ends of said arms by use of a spindle having first and second oppositely threaded sections pivotably connected to said first ends of said first and second arms.

* * * * *